May 10, 1949.     H. E. WIMPFHEIMER     2,469,620
EMBOSSING DIE
Filed Sept. 16, 1944
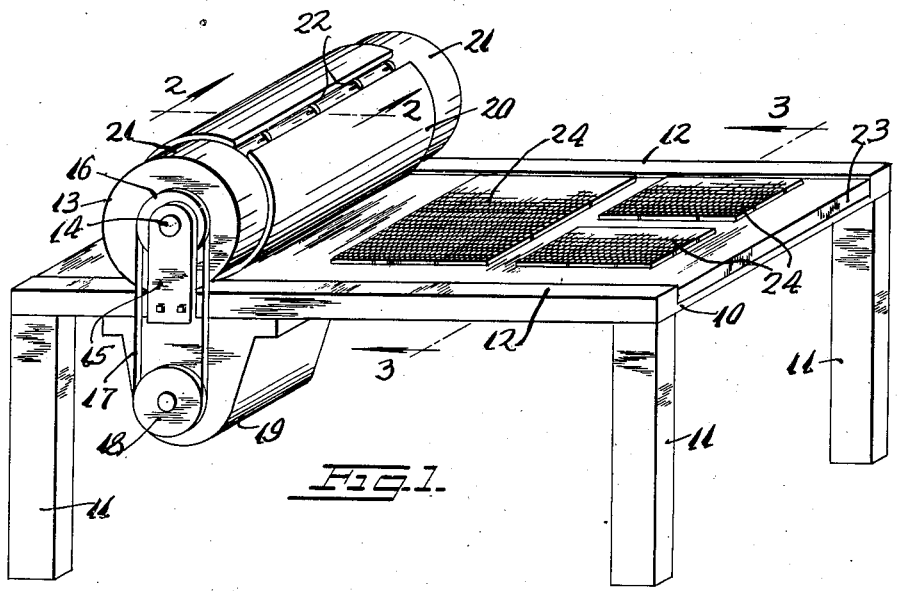
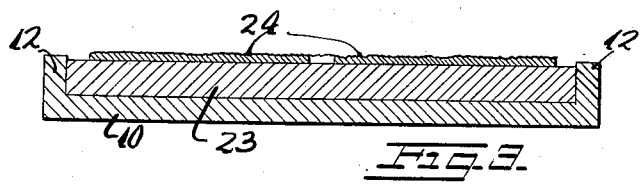
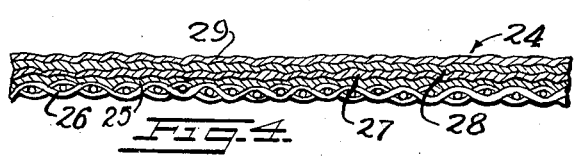
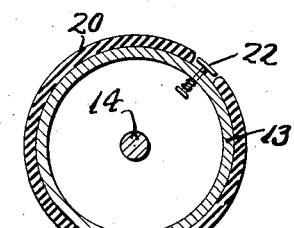
INVENTOR.
Harry E. Wimpfheimer
BY
ATTORNEY Patented May 10, 1949

2,469,620

UNITED STATES PATENT OFFICE 2,469,620

EMBOSSING DIE

Harry E. Wimpfheimer, New York, N. Y.

Application September 16, 1944, Serial No. 554,529

1 Claim. (Cl. 101—28)

This invention relates to new and useful improvements in an embossing machine, and method of making same.

More specifically, the present invention proposes the construction of an embossing machine having a cylinder roll and slidable table, in which the cylinder roll is provided with a flexible surface and the slidable table is provided with a raised die surface.

Still further it is proposed to provide an embossing machine including a die having a fabric design embossing surface.

Still another object is to provide an embossing machine having a metallized fabric embossing die.

A further object of the invention is to provide an embossing die formed of a sheet of fabric, a superposed layer of copper, a superposed layer of nickel and a superposed layer of steel.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a diagrammatic perspective view of an embossing machine constructed in accordance with this invention.

Fig. 2 is an enlarged section on the line 2—2 of Fig. 1.

Fig. 3 is an enlarged section on the line 3—3 of Fig. 1.

Fig. 4 is an enlarged transverse vertical section through the embossing die of the present invention.

The embossing machine of the present invention is shown diagrammatically in the drawings, only enough of the structure being shown to understand the present invention. It includes according to this invention, a table 10 supported on legs 11 and having raised spaced longitudinal tracks 12 on its upper surface. A cylinder roll 13 is mounted on a shaft 14 journalled in bearing blocks 15 secured to the table. A pulley 16 is mounted on one end of shaft 14, and this pulley is driven by a belt 17 extending over a pulley 18 of an electric motor 19 secured to the under side of the table.

The cylinder roll 13 has an external cover of rubber 20 which is not as wide as the roll 13 leaving an annular track 21 at each end thereof rollably engaging tracks 12. Spring actuated catches 22 are secured in a transverse line to the roll 13 for mounting a sheet of material on the roll in the usual manner of printing and embossing machines.

A rectangular plate 23 is slidably disposed on the table 10 between the tracks 12, the tracks 12 forming guides for the plate 23. An embossing die 24 is secured to the plate 23 as by countersunk screws or other suitable means.

The die 24 has an irregular upper surface adapted to impress its contour on a sheet of paper for embossing same when the sheet of paper is pressed into the die, which pressing is done by the roll 13, the plate 23 sliding under the roll and carrying the die under the roll when the roll is rotated by the electric motor 19.

Die 24 is a laminated structure formed of five different layers of material. The method of forming die 24 is as follows:

First a sheet of material having a suitable surface for embossing, such as a sheet of canvas or burlap 26, is taken and placed in a mold and the upper side of the sheet is coated with graphite 25. Then molten copper is deposited into the mold, the graphite preventing the copper from burning the burlap. The burlap is coated with only a thin layer of copper 27 which conforms to the shape of the burlap, the many intersections of threads in the burlap producing rows of projections on the copper. Then a layer of nickel 28 is deposited on the copper and finally a layer of steel 29 is deposited on the nickel, the deposition of nickel and steel being by any suitable well known method such as by electroplating. The steel outer surface forms the die surface, and this surface will be pimpled corresponding to the surface contour of the burlap. Thus the die is actually a metallized sheet of cloth.

The operation of the embossing machine is as follows:

The die 24 formed as above set forth is attached to the plate 23 with the steel surface upward. Then a sheet of paper (not shown) is secured to the roll 13, the ends of the paper being pressed against the rubber cover 20 by the catches 22. The roll is then rotated by the motor 19, and in revolving, pulls the plate 23 under it. The roll is set so that one end of the paper on one side of the catches will engage the beginning of the die 24. The motor is stopped when the other end of the paper is pressed into the die. Thus the catches do not interfere with the rolling operation. The rubber cover gives away as the pebbling occurs on the sheet of paper, and then springs back into a smooth surface once more, but does not affect the pebbling once formed on the paper.

There are many other ways of operating the machine, as will be obvious. For instance, a sheet of paper may be superposed on top of the die 24 and the rubber roll may roll this sheet in. In such case the catches 22 would not be needed. It will be noted that the rubber cover is raised from the tracks 21 and the die is raised from the tracks 12 which insures sufficient pressure between the rubber cover 20 and the die 24.

Other sheets of material besides burlap may be employed in the forming of the die to give different contour dies. This method of forming embossing dies eliminates the tedious, expensive conventional method of cutting out the contour on the die surface. It has been found that a die constructed in accordance with this invention having a .020 inch thick layer of copper, a .010 inch thick layer of nickel and an .010 inch thick layer of steel produces a good embossing surface.

While the machine has been shown diagrammatically to illustrate the principles of the present invention, it will be understood that more complicated machines, embodying the present invention, may be provided. For instance, a conventional printing press may be employed, the roll being covered by the cover 20 and die 24 being substituted for the printing die. In such a modified printing press the roll will be provided with the usual well known automatic means for picking up a sheet of paper and holding it to the roll.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A die for embossing paper with a textile design, comprising a base sheet of woven textile material carrying the design to be transferred to paper, a primary coat of thin copper united to the textile material and reproducing the design thereof, a thin coat of nickel deposited on the copper and reproducing the design of the base textile sheet, and a final coat of thin steel deposited on the nickel and reproducing the design of the base textile sheet and providing the final embossing surface for pressure transferring the design of the base textile sheet to the paper to be embossed.

HARRY E. WIMPFHEIMER.

REFERENCES CITED

The following references are of record in the file of this patent:

UNITED STATES PATENTS

| Number | Name | Date |
|---|---|---|
| 36,228 | Merritt | May 19, 1862 |
| 95,053 | Smith | Sept. 21, 1869 |
| 113,699 | Smith | Apr. 11, 1871 |
| 127,756 | Fowle | June 11, 1872 |
| 270,866 | Weber | Jan. 16, 1883 |
| Re. 11,106 | Blank | Aug. 26, 1890 |
| 440,166 | Kitchell | Nov. 11, 1890 |
| 444,835 | Hobson | Jan. 20, 1891 |
| 567,030 | Kelsey | Sept. 1, 1896 |
| 631,366 | Golding | Apr. 22, 1899 |
| 844,380 | Marwick | Feb. 19, 1907 |
| 901,109 | Kuhlman | Oct. 13, 1908 |
| 957,937 | Cook | May 17, 1910 |
| 981,364 | Bigelow | Jan. 10, 1911 |
| 1,037,469 | Boldberg | Sept. 3, 1912 |
| 1,193,013 | Grant | Aug. 1, 1916 |
| 1,203,529 | Geisman | Oct. 31, 1916 |
| 1,401,980 | Hanson | Jan. 3, 1922 |
| 1,444,779 | Clark | Feb. 13, 1923 |
| 1,912,889 | Couse | June 6, 1933 |
| 1,935,916 | Ragsdale | Nov. 21, 1933 |
| 2,027,296 | Stuart | Jan. 7, 1936 |
| 2,288,020 | Noland et al. | June 30, 1942 |
| 2,340,485 | Norris | Feb. 1, 1944 |
| 2,370,186 | Oldofredi | Feb. 27, 1945 |
| 2,390,183 | Seligman | Dec. 4, 1945 |
| 2,395,448 | Brennan et al. | Feb. 26, 1946 |